United States Patent
Shimotono

(12) 
(10) Patent No.: US 6,509,911 B1
(45) Date of Patent: Jan. 21, 2003

(54) POWER MANAGEMENT METHOD AND DEVICE FOR DISPLAY DEVICES

(75) Inventor: Susumu Shimotono, Hadano (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/447,145

(22) Filed: Nov. 23, 1999

(30) Foreign Application Priority Data

Nov. 26, 1998 (JP) .......................................... 10-335233

(51) Int. Cl.[7] .............................. G06F 3/00; G09G 5/00
(52) U.S. Cl. ........................ 345/761; 345/212; 345/1.1; 713/320; 713/324
(58) Field of Search ................................ 345/761, 212, 345/211, 867, 764, 778, 859, 856, 1.3, 1.1, 4, 2.1; 713/320, 324, 323, 300

(56) References Cited

U.S. PATENT DOCUMENTS

| | | | | |
|---|---|---|---|---|
| 5,448,262 A | * | 9/1995 | Lee et al. | 345/212 |
| 5,841,431 A | * | 11/1998 | Simmers | 345/211 |
| 5,874,928 A | * | 2/1999 | Kou | 345/1.1 |
| 5,954,820 A | * | 9/1999 | Hetzler | 713/323 |
| 6,108,028 A | * | 8/2000 | Skarbo et al. | 345/867 X |
| 6,233,691 B1 | * | 5/2001 | Atkinson | 713/323 |

FOREIGN PATENT DOCUMENTS

| | | |
|---|---|---|
| JP | 05-281943 | 10/1993 |
| JP | 07-271549 | 10/1995 |
| JP | 10-078946 | 3/1998 |
| JP | 10-269055 | 10/1998 |

* cited by examiner

Primary Examiner—Raymond J. Bayerl
(74) Attorney, Agent, or Firm—Bracewell & Patterson, LLP

(57) ABSTRACT

The positions of a mouse pointer and of an active window, as well as the operating state of a keyboard/mouse, is used to determine the power state of each display in a multiple-display system. A system in accordance with the preferred embodiment includes only one of each of two resources (an active window and a mouse pointer). The positions of the resources on a plurality of screens are determined, and when they have not been displayed on a specific monitor for a specific period of time, that monitor is moved to a low power consumption mode (a low power operating state). Since, when a user of a system using multiple monitors is creating a document with a word processor, only one monitor is normally required, other monitors may be put in a low-power state, even though full use is being made of the keyboard/mouse.

16 Claims, 8 Drawing Sheets

Examples

POWER MANAGEMENT METHOD AND DEVICE FOR DISPLAY DEVICES

CROSS REFERENCE TO RELATED APPLICATION

This application claims priority from Japanese Patent Application 10-335233, filed Nov. 26, 1998 (MM/DD/YY), which is commonly assigned with the present application and is hereby incorporated by reference. The contents of the present application are not necessarily identical to the contents of the priority document.

BACKGROUND OF THE INVENTION

1. Technical Field

The present invention generally relates to an improved data processing system, and in particular to improved management for display devices of a data processing system. Still more particularly, the present invention relates to a method and a device for individually changing the power modes (operating modes) of a plurality of display devices.

2. Description of the Related Art

For a conventional computer, and for a notebook computer in particular, a display device is moved to a power saving mode by determining under what conditions the device is being used by a user (e.g., data being entered via a keyboard). However, since the appearance of Microsoft Windows 98® as a standard, multiple displays of up to a maximum of nine screens can be supported by a personal computer (PC).

In addition, since Windows 98 appeared, screen blanking (screen erasing) can be rejected by an application that uses a new Application Programming Interface (API). However, screen blanking (screen erasing) is established with the assumption that it will mainly be used by a presentation application, and that normally an application will make no unnecessary use of the API. This is recited by Microsoft in the WindowsSDK® (Windows Software Development Kit).

As a result, only a determination as to whether or not a user is watching the screen of a monitor can be considered to be an effective control factor. However, since a user may not always watch a monitor, even though the monitor may occupy a location within the user's visual field, this constitutes a proposition for which no universal resolution is available. Therefore, the point in this case is how well this proposition corresponds to a condition that applies to a user.

The easiest mounting method is a method that provides control for all the displays that use the same determination references, which corresponds to the process performed by Windows 98. That is, when a keyboard and a mouse have not been accessed for a specific period of time, all the monitors are moved to the DIM (low power consumption) state in accordance with the operating states (idle states) of the keyboard and the mouse.

According to this mounting method, for a job that primarily involves the typing of a document, all the monitors except for one are uselessly maintained in the ON state. In the current Windows 98®, all the monitors are maintained in the ON state while either the keyboard or the mouse is in use, and in this case, electric power is apparently wasted.

Japanese Unexamined Patent Publications No. Hei 6-83491 and No. Hei 7-302138 describe current approaches to the problem described. Japanese Unexamined Patent Publication No. Hei 6-83491, commonly assigned, with the present application, to International Business Machines Corp., discloses a technique for collecting power consumption associated data for a plurality of computer components, and for minimizing the power consumption by the computer accordingly.

Japanese Unexamined Patent Publication No. Hei 7-302138 (applicant: Cannon Corp.) discloses a technique for storing, for each application, history data for the accessing of individual devices, and for executing a power down function in accordance with the application and the devices.

However, nothing in the art, or in these references in particular, teaches or suggests a method for controlling the power supply to individual display devices according to the what each display device is displaying.

SUMMARY OF THE INVENTION

It is therefore one object of the present invention to provide an improved data processing system.

It is another object of the present invention to provide improved management for display devices of a data processing system.

It is yet another object of the present invention to provide a method and system for individually changing the power modes (operating modes) of a plurality of display devices.

The foregoing objects are achieved as is now described. Specifically, the positions of a mouse pointer and of an active window, as well as the operating state of a keyboard/mouse, is used to determine the power state of each display in a multiple-display system. A system in accordance with the preferred embodiment includes only one of each of two resources (an active window and a mouse pointer). The positions of the resources on a plurality of screens are determined, and when they have not been displayed on a specific monitor for a specific period of time, that monitor is moved to a low power consumption mode (a low power operating state). Since, when a user of a system using multiple monitors is creating a document with a word processor, only one monitor is normally required, other monitors may be put in a low-power state, even though full use is being made of the keyboard/mouse.

The above as well as additional objectives, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
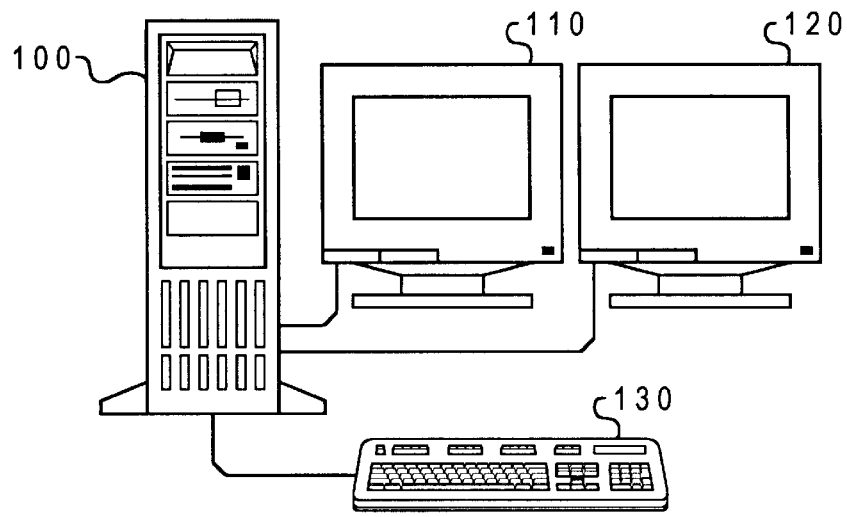
FIG. 1 depicts the external appearance of a computer system in accordance with a preferred embodiment of the present invention.

FIG. 1 is a diagram illustrating the external appearance of a computer system that, according to the preferred embodiment of the present invention, can support multiple display devices. FIG. 1 shows a tower computer, a computer configuration that is popular on the market. However, the present invention is not limited to a tower computer, and can be applied to many computer types, such as desktop or notebook computers.

Furthermore, the system of the present invention is not limited to a client computer, and so long as a computer can support a multiple display function, the preferred embodiment can also be employed for a server computer or a host computer.

The computer system comprises the main body of tower computer 100; a keyboard unit 130, which is connected to the computer 100 via a cable; and display devices 110 and 120, such as CRTs or liquid crystal displays (LCDs). Screen information that is generated by a graphics adaptor incorporated in the main body of the computer 100 is transmitted to, via a cable, and displayed on the display devices 110 and 120. The power states of the display devices 110 and 120 are controlled by the graphics adaptor (which will be described later) incorporated in the main body of the computer 100.

Figure 2:
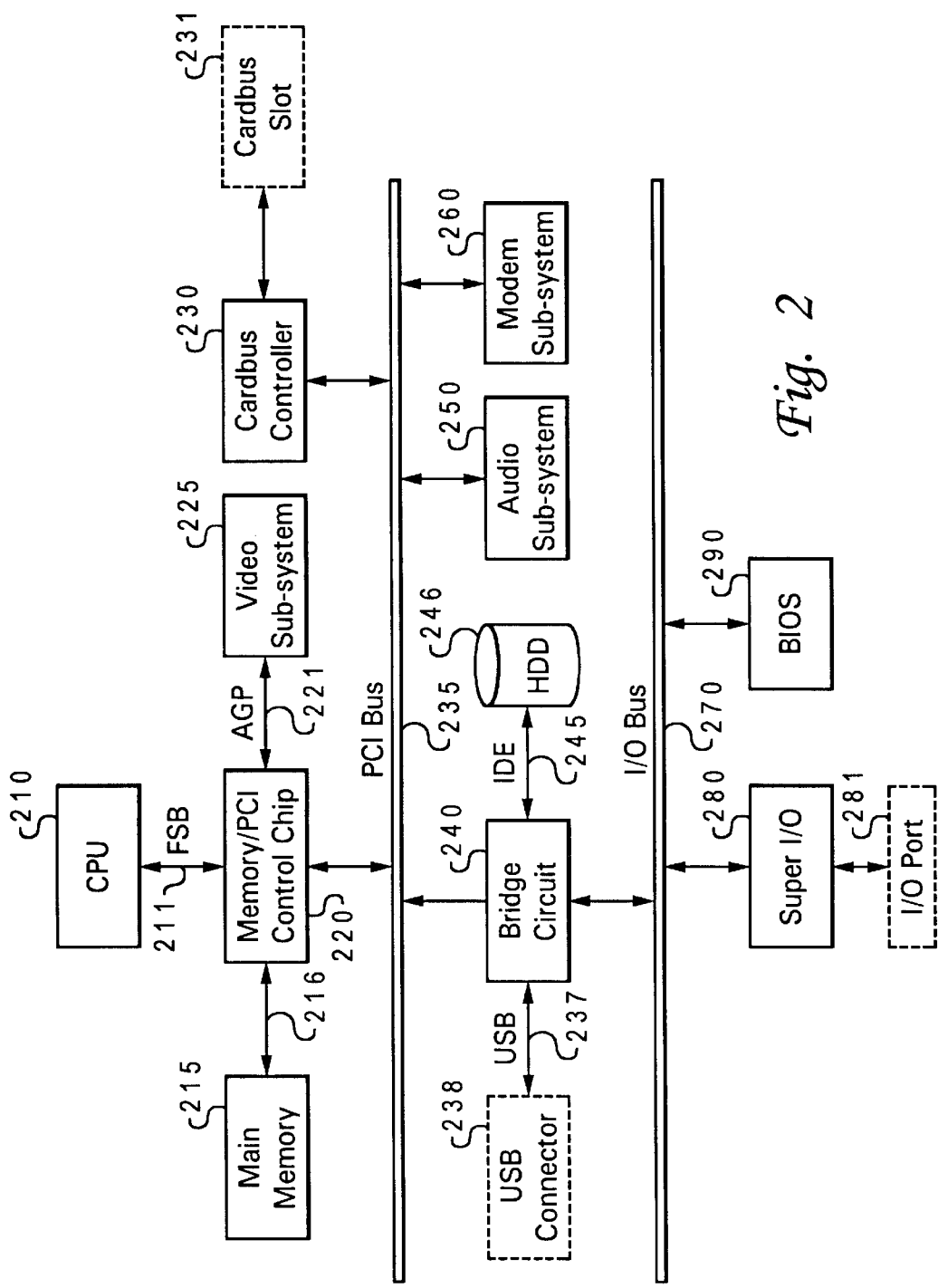
FIG. 2 is a block diagram illustrating the main body of a computer in accordance with a preferred embodiment of the present invention.

FIG. 2 is a specific diagram illustrating, for each sub-system, the hardware arrangement of a motherboard and the other components of a personal computer (PC) 100 according to the preferred embodiment. The tower PC 100 conforms to the OADG (PC Open Architecture Developer's Group) specifications, and an operating system (OS), such as either Microsoft Windows 98®, Microsoft Windows NT®, or OS/2® from IBM Corp. is mounted on it. The PC 100 has a variety of ports accessible at the rear of the main body, and various devices that can be accessed from the front.

A CPU (processor) 210, the main controller of the computer 100, executes various programs under the control of the OS. The CPU 210 can be, for example, a CPU "Pentium" chip, an "MMX technology Pentium" chip, a "Pentium II" or a "Pentium Pro," all of which are produced by Intel Corp., a CPU produced by another company, such as AMD Corp., or a Power PC produced by IBM Corp.

The CPU 210 is connected to hardware components, which will be described later, via three layered buses, i.e., an FSB (Front Side Bus) 211, which is a processor bus connected to its external pins; a PCI (Peripheral Component Interconnect) bus 235, which serves as a fast I/O device bus; and an I/O bus 270, such as an ISA (Industry Standard Architecture) bus, which serves as a slow I/O device bus.

The FSB 211, which is a processor bus, and the PCI bus 235 communicate with each other across a bridge circuit (a host-PCI bridge circuit) that is generally called a memory/PCI control chip 220.

The memory/PCI control chip 220 in this embodiment includes a memory controller for controlling an operation for accessing a main memory 215, and a data buffer for absorbing a data transfer speed difference between the buses 211 and 235. Such an example chip is the 440EX or the 440GX from Intel Corp.

The main memory 215 is volatile memory and is used as a writing area for an executing program of the CPU 210, or as a work area for the program. Generally, the main memory 215 consists of a plurality of DRAM (Dynamic RAM) chips. A memory capacity of, for example, 32 MB is provided as a standard and can be expanded to 256 MB. Recently, in order to respond to requests for increased processing speeds, RDRAM is beginning to be used instead of such DRAM as fast page DRAM, EDO DRAM, synchonous DRAM (SDRAM) and burst EDO DRAM. Any common memory type can be used in a system according to the preferred embodiment.

The programs to be executed include device drivers that access an OS such as Windows 98 and peripheral devices, various application programs that are prepared for specific jobs, and firmware such as a BIOS stored in a ROM 290.

A Level 2 (L2) cache comprising high-speed memory has recently been incorporated in the CPU 210 to absorb the time required by the CPU 210 to access the main memory 215. A very limited amount of code and data that the CPU 210 accesses frequently can be temporarily stored in the L2-cache. Generally, the L2-cache consists of SRAM (Static RAM) chip, and its memory capacity is, for example, 512 KB or greater.

The PCI bus 235 is a bus for the performance of a relatively fast data transfer, which in this embodiment, includes a bus width of 32/64 bits, a maximum operating frequency of 33 MHz and a maximum data transfer speed of 132/264 MBYTE/SEC. PCI devices, such as a cardbus controller 230, operated at relatively high speeds are connected to the PCI bus 235. The PCI architecture was originated and advocated by Intel Corp., and implements a so-called PnP (Plug-and-Play) function.

The video sub-system 225 is a sub-system for in implementing a function associated with video. The video sub-system 225 includes a video controller that processes graphics commands received from the CPU 210 and temporarily writes the processed graphics information in a video memory (VRAM), and that thereafter reads graphic information from the VRAM and outputs them to a liquid crystal display (LCD). The video controller uses an attached digital/analog converter (DAC) to convert a video signal to an analog signal, and then outputs the analog video signal to the CRT port via a signal line.

The video sub-system 225 is connected to the memory/PCI control chip 220 via the AGP (Accelerated Graphics Port) bus. The video sub-system 225 will be described in detail later with reference to FIGS. 3 and 4.

The cardbus controller 230 is a dedicated controller for directly transmitting a bus signal carried by the PCI bus 235 to the interface connector (cardbus) for a PCI card slot 231 that is formed in the wall of the main body of the computer 100. A PC card (not shown), which conforms to the specifications (e.g., "PC Card Standard 95") established by the PCMCIA (Personal Computer Memory Card International Association) and the JEIDA (Japan Electronic Industry Development Association), can be inserted into the card slot.

The PCI bus 235 and the I/O bus 270 are connected together by a bridge circuit (PCI-I/O bridge circuit) 240.

The bridge circuit 240 in this embodiment includes a DMA it controller, a programmable interrupt controller (PIC) and a programmable interval timer (PIT). The DMA controller is a dedicated device for performing data transfers between peripheral devices (e.g., an FDD) and the main memory 215, without any assistance being provided by the CPU 210. The PIC is a dedicated controller for executing programs (interrupt handlers) in response to interrupt requests (IRQs) received from individual peripheral devices. The PIT is a device for generating a timer signal in consonance with a predetermined cycle. The cycle of the timer signal generated by the PIT is programmable.

The bridge circuit 240 in this embodiment also includes an IDE (Integrated Drive Electronics) interface for connecting external storage devices that conform to the IDE specifications. An IDE hard disk drive (HDD) 246 is connected to the IDE interface, and an IDE CD-ROM drive is connected to it by the ATAPI (AT Attachment Packet Interface). Other types of IDE devices, such as DVD (Digital video Disc or Digital Versatile Disc) drives, may be connected instead of IDE CD-ROM drives. External storage devices, such as the HDD 246 and the CD-ROM drive, are stored inside the computer 100 in an open area called the "media bay" or the "device bay." Other devices, such as battery packs or floppy disk drives (FDDs), can be exchanged exclusively for these storage devices.

The bridge-circuit 240 in this embodiment has a USB (Universal Serial Bus) host controller and a routing hub for connecting a USB and a USB port 238, which is formed in the wall of the computer 100. The USB supports a hot plugging function for the insertion and removal of additional peripheral devices (USB devices) while the computer 100 is powered on, and a plug-and-play function for automatically identifying newly connected peripheral devices and for re-setting the system configuration. A maximum of 63 USB devices can be daisy-chained and connected to a single USB port. Example USB devices are keyboards, mouse, joysticks, scanners, printers, modems, display motors, and tablets.

The I/O bus 270 is, for example, an ISA bus along which the data transfer speed is lower (a bus width of 16 bits and a maximum data transfer speed of 4 MEps) than is the speed of the PCI bus 235. The I/O bus 270 is used to connect peripheral devices, such as the ROM 290, a real time clock (RTC), a Super I/O controller 280, and a keyboard/mouse controller, that are driven at a relatively low speed.

The ROM 290 is a nonvolatile memory for the permanent storage of a code group (BIOS: Basic Input/Output System) for the input and output signals for the hardware components, such as a keyboard and a floppy disk drive (FDD), and a test program (POST: Power On Self Test) that is run when the system 100 is first powered on.

The Super I/O controller 280 is a peripheral controller for driving the floppy disk drive (FDD), and for controlling the input/output of parallel data (PIO) via a parallel port, and the input/output of serial data (SIO) via a serial port.

An audio sub-system 250 and a modem sub-system 260 will be described later.

Although many electric circuits other than those shown in FIG. 2 are required to construct the computer 100, they are well known to one having ordinary skill in the art. And as they are not directly related to the subject of the present invention, no explanation for them will be given. Further, it should be noted that, to avoid making the drawings too complex, only one part of the connections joining the hardware blocks in FIG. 2 is shown.

Figure 3:
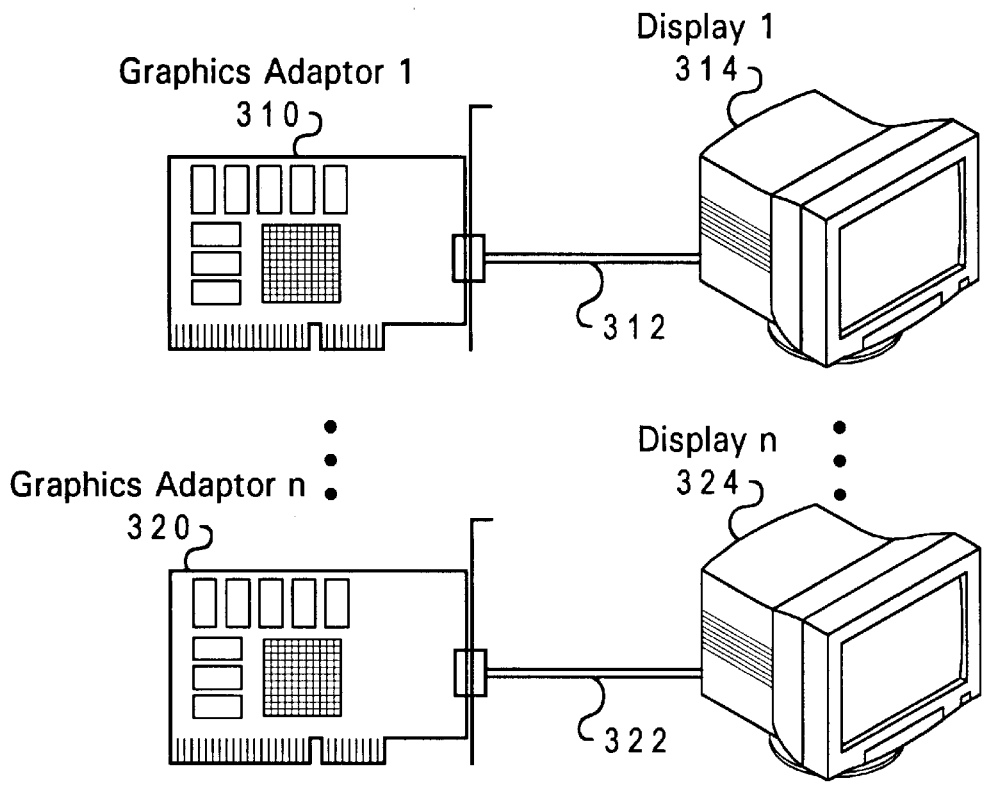
FIG. 3 is a diagram illustrating the external appearance of video sub-systems and display devices in accordance with a preferred embodiment of the present invention.
Figure 4:
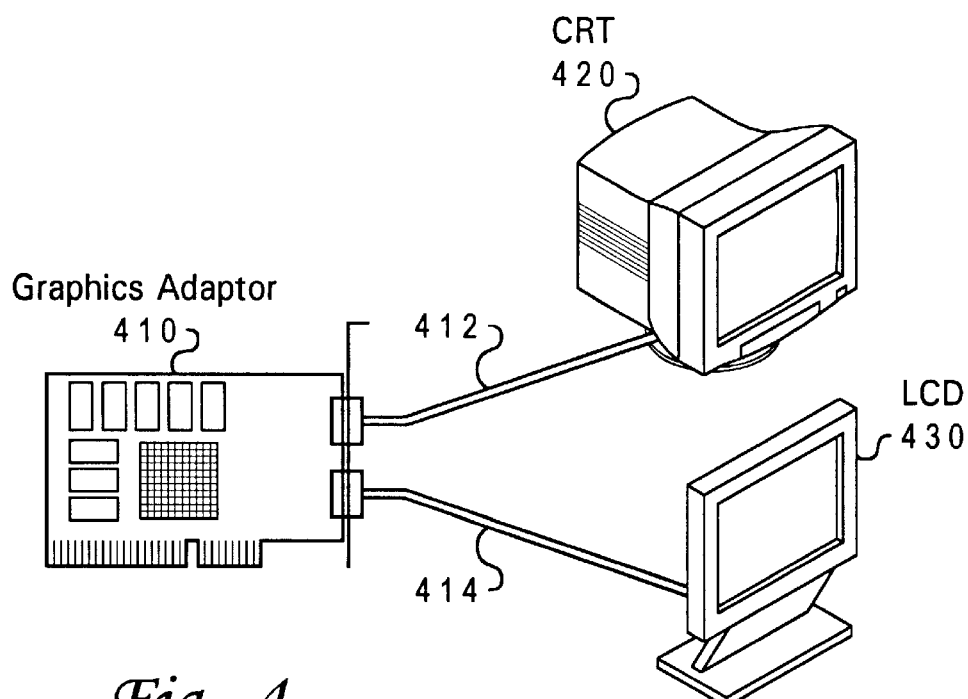
FIG. 4 is a diagram illustrating the external appearance of a video sub-system and display devices in accordance with a preferred embodiment of the present invention.

FIGS. 3 and 4 are detailed diagrams illustrating one part of the video sub-system 225 described above with reference to FIG. 2. In order to support multiple display devices using a single computer, two methods are available: method 1, for mounting in a computer a plurality of graphics adaptors, each of which supports a single display; and method 2, for mounting in a computer a graphics adaptor that supports multiple display devices. Method 1 is shown in FIG. 3 and method 2 is shown in FIG. 4.

According to method 1 in FIG. 3, a plurality of graphics adaptors 1 to n (310 to 320) are used, and display devices 314 to 324 are respectively connected to the graphics adaptors 1 to n (310 to 320) via cables 312 to 322. In the arrangement in FIG. 3, the graphics adaptors 310 to 320 are individually controlled by an OS or by an application program, and normally, different contents are displayed on the screens. The graphics adaptors 1 to n (310 to 320) include one or more graphics controllers (or CRTCs), each of which supports a single display device.

According to method 2 in FIG. 4, one graphics adaptor 410 is used, and a plurality of display devices (CRTs) 420 and a liquid crystal display (LCD) device 430 are respectively connected to the graphics adaptor 410 via cables 412 and 414. In the arrangement in FIG. 4, the graphics adaptor 410 is controlled by an OS or an application program, and the same or different contents are displayed on the display devices. The graphics adaptor 410 includes either multiple graphics controllers, each of which supports a single display device, or one or more graphics controllers (or CRTCs) that can support a plurality of display devices.

In addition to the graphics controllers, the graphics adaptors 1 to n (310 to 320 and 410) shown in FIGS. 3 and 4 generally include a video memory, a DAC, a clock generator and a connector for the connection of a cable. These components may be mounted on an adaptor card board other than the motherboard as is shown in FIGS. 3 and 4, or they may be mounted on the motherboard with other components.

Most of the current computer OSs support a display power management mode via an interface for an application. For example, Microsoft Windows 98® supports the power management architecture called OnNow via ACPI (Advanced Configuration and Power Interface). In OnNow, the standby state (D1) and the suspended state (D2), as well as the normal ON state (D0) and OFF state (D3), are supported as display power modes (operating states). In the specifications for the present invention, basically, "OFF" includes the "standby" and the "suspended" states.

Figure 5:
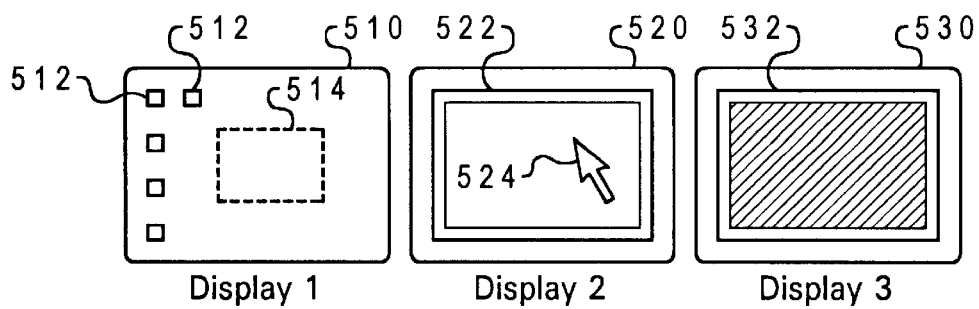
FIG. 5 is a diagram showing the screens of the display devices in the computer system in accordance with a preferred embodiment of the present invention.
Figure 6:
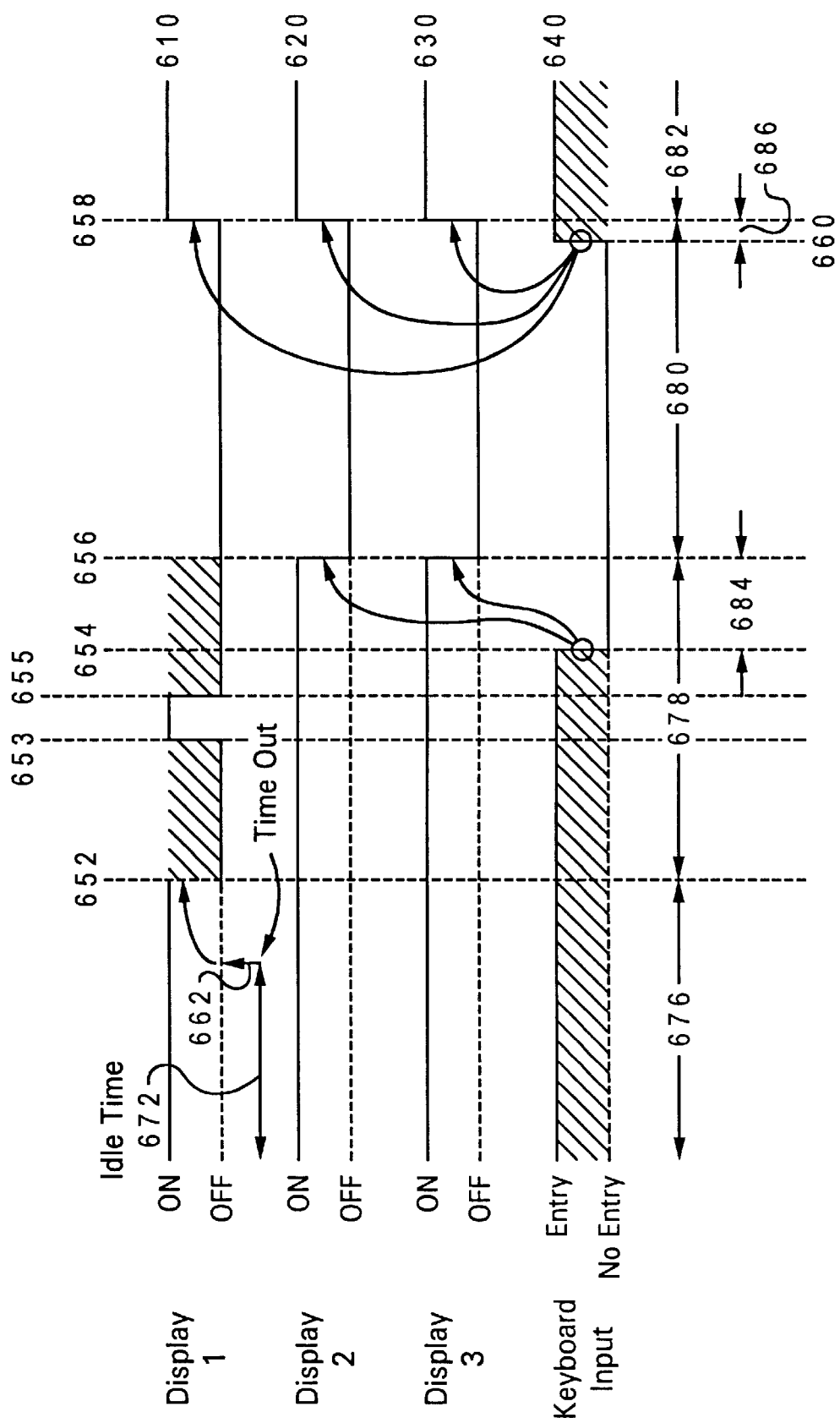
FIG. 6 is a timing chart showing the changes in the power states of the display devices in FIG. 5, in accordance with a preferred embodiment of the present invention.

FIG. 5 is a schematic diagram illustrating the screens of three display devices according to the present invention. FIG. 6 is a time chart showing the timings of the operation performed by the three display devices in FIG. 5.

The basic processing performed by the preferred embodiment will now be described with reference to FIGS. 5 and 6. The screens of the three display devices are shown in FIG. 5, and the arrangement that provides for the employment of these display devices is implemented when n=3 in FIG. 3.

A plurality of window icons 512 are displayed on the first display device 1 (510). These window icons 512 are not active. A mouse cursor (or a mouse pointer) 524 is displayed on an enlarged window 522 on a second display device 2 (520). The window 522 is inactive. An active enlarged window 532 is displayed on a third display device 3 (530).

The states shown in FIG. 5 correspond to the leftmost states shown on the time chart in FIG. 6. In FIG. 6, the power supply state of the display device 1 is indicated by a line 610. The display device 1 at first is in the ON state, and the window icons are displayed that are described referring to FIG. 5. Since neither the mouse cursor 524 nor the active window 532 is displayed on the screen of the display device 1 (to the left of time 652), it is assumed that the operating state of the display 1 can be moved to the OFF state, or the power saving mode, after a specific idle time period has elapsed. When time period 662 has expired, the display device 1 is turned off at time 652. On the other hand, since the mouse cursor 524 is displayed on the screen of the display device 2 and since the active window 532 is displayed on the screen of the display device 3, unlike the display device 1, the devices 2 and 3 are not powered off at time 652 and remain on.

After a specific period has elapsed following time 652, starting at time 653 a pop-up window 514 is displayed on the display device 1 for a short period of time. Accordingly, the display device 1 is entered to the ON state to display the pop-up window. Thereafter, the pop-up window disappears upon the receipt of an instruction entered by a user, and when a predetermined time period has elapsed, the device 1 is again moved to the OFF state (at time 655).

When a period of time has elapsed following time 655, and time 654 has been reached and data entry has stopped at an input device, such as a keyboard or a mouse, connected to the computer 100, after a predetermined time 684 has expired a time out occurs (at time 656). The time out for the entry of data at the keyboard/mouse is used as a trigger, so that the display devices 2 (620) and 3 (630) are moved to the OFF state, or to the power saving mode, by a conventional power saving mechanism (at time 656).

Therefore, at time 656 all of the three display devices are in the OFF state or in the power saving mode. When a further period of time has elapsed, and when at time 660 data are entered at the keyboard, all three display devices are activated by using the entry of data as a trigger (at time 658).

It should be noted that while the display devices 1 to 3 are in the OFF state during a period extending from time 656 to time 658, the trigger for moving the display device 1 to the OFF state differs from the trigger for moving the display devices 2 and 3 to the OFF state. That is, the display devices 2 and 3 are moved to the OFF state (at time 684) by the using of a conventional trigger, the occurrence/nonoccurrence of a data entry at the keyboard, while the display device 1 is moved to the OFF state (at time 652) by using the contents-displayed on the screen as a trigger.

Figure 7:
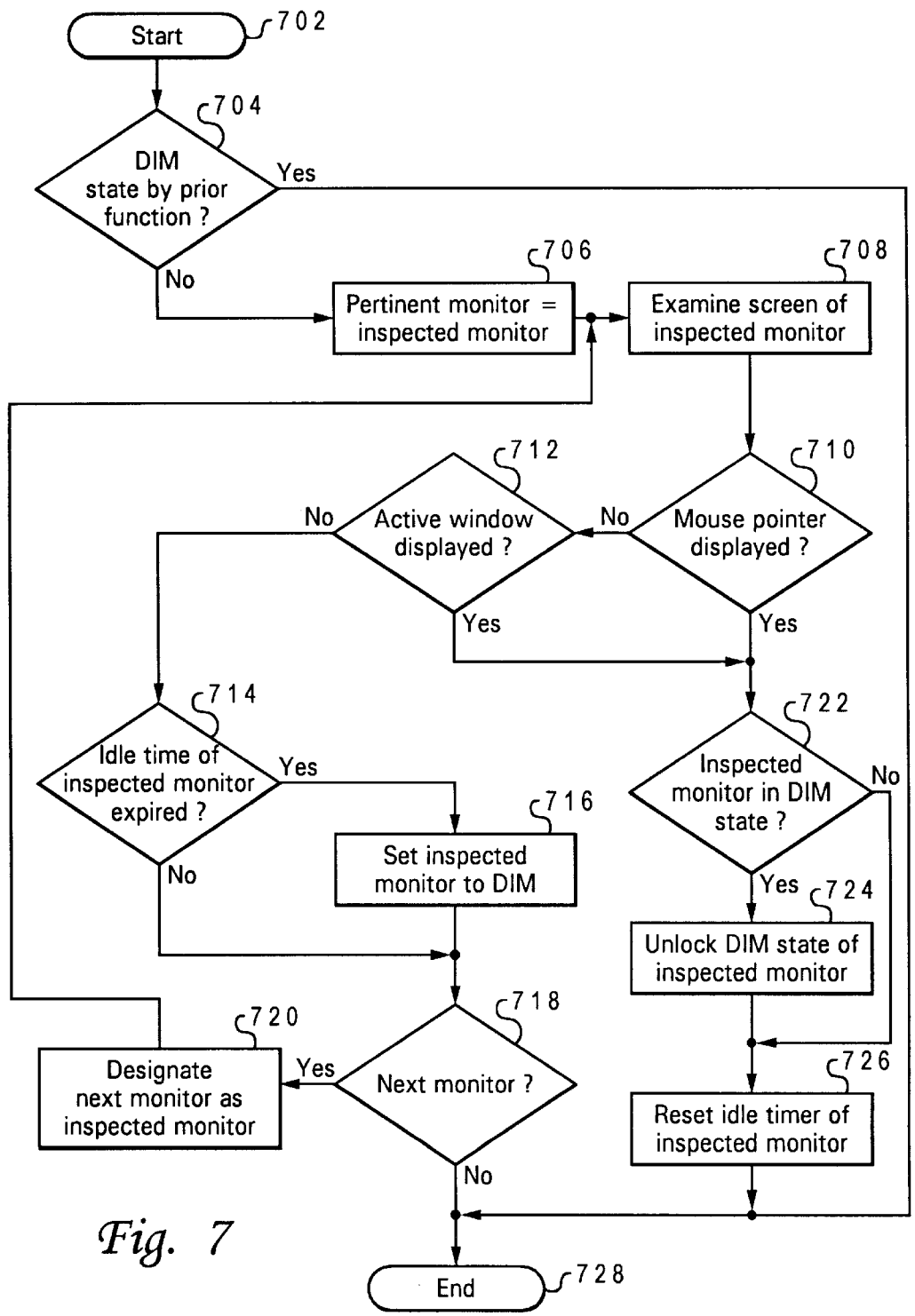
FIG. 7 is a flowchart showing the processing performed in accordance with a preferred embodiment of the present invention.

FIG. 7 is a flowchart showing the outline of the processing for the present invention. The processing is initiated at step 702, and at block 704 a check is performed to determine whether the display device is to be moved to a low power consumption state (DIM) by a conventional power management function.

When at step 704 the computer is not in the DIM state, program control advances to block 706. When the computer is in the DIM state, program control moves to block 728, whereat the processing is terminated. At block 706 the monitor of a pertinent display device is designated as an inspected monitor. At block 708 the contents displayed on the monitor are examined.

At block 710 the results obtained at block 708 are used to determine whether a mouse pointer is displayed on the screen of the monitor. When a mouse pointer is displayed on the monitor, program control goes to block 722. But when a mouse pointer is not displayed, program control advances to block 712. At block 712 a check is performed to determine whether an active window is being displayed on the screen of the monitor. When an active window is being displayed on the screen of the monitor, program control goes to block 722. But if an active window is not being displayed, program control moves to block 714.

At block 714 a check is performed to determine whether a time out occurs by an idle timer of the monitor. When a time out occurs, program control goes to block 716, and when a time out doesn't occur, program control advances to block 718. At block 716 the monitor is set to the DIM state in accordance with the preferred embodiment.

At block 718 a check is performed to determine whether another monitor is present. When another monitor is present, program control advances to block 720. But if no additional monitor is present, program control goes to block 728 and the processing is terminated.

At block 720 the additional monitor is designated as an inspected monitor, and subsequently the processing at blocks 708 through 718 is repeated until no additional monitor is found.

At block 722 a check is performed to determine whether the inspected monitor is in the DIM state. When the monitor is in the DIM state, program control advances to block 724. Whereas if the monitor is not in the DIM state, program control goes to block 726.

At block 724 the DIM state of the monitor is unlocked. At block 726 the idle timer of the monitor is again set (or reset).

The pop-up window described referring to FIG. 6 is one of the active windows in FIG. 7.

Figure 8:
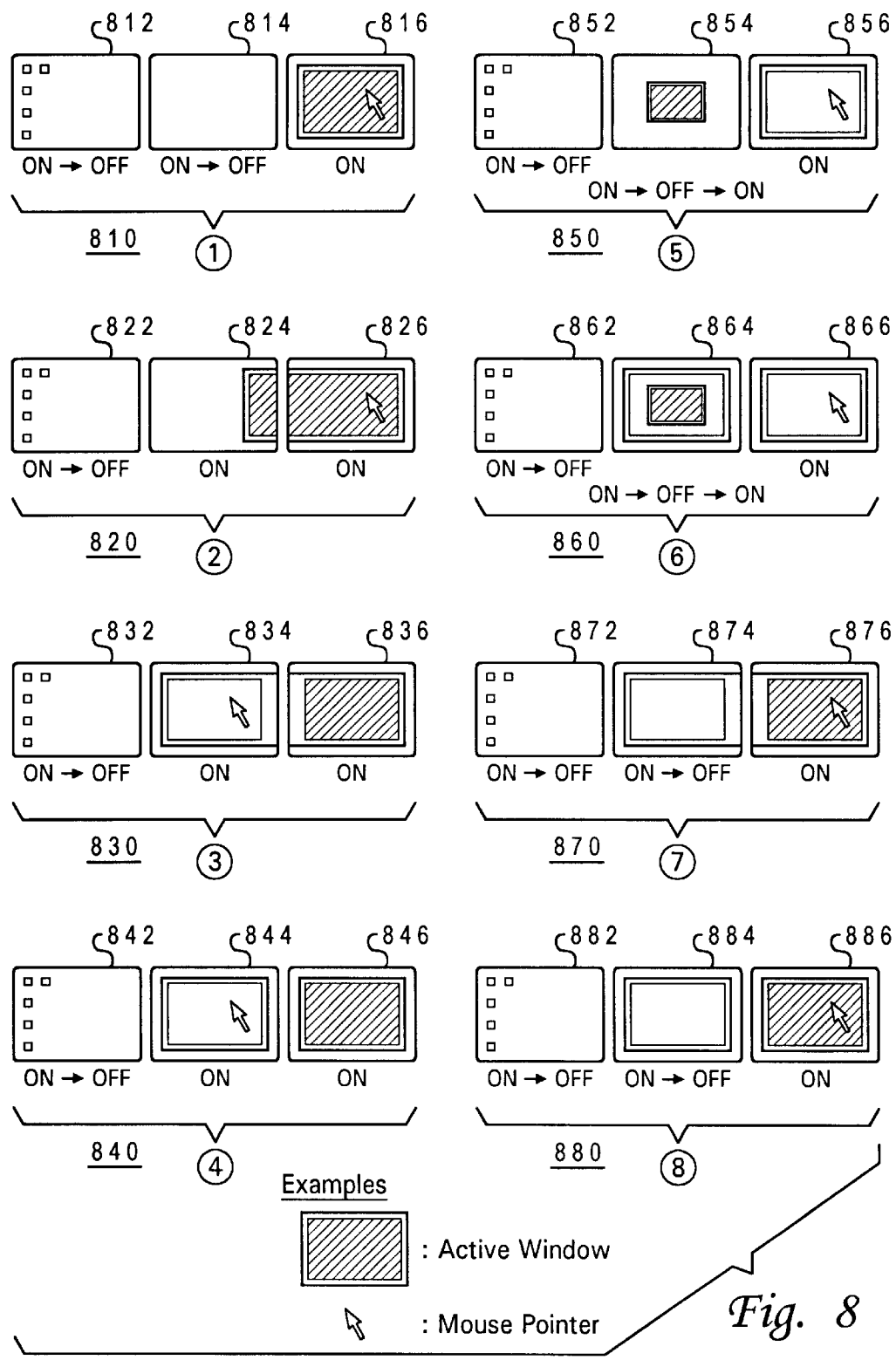
FIG. 8 is a diagram showing display screens for explaining the actual operations performed by the present invention.

In FIG. 8 are shown eight screen conditions used for an explanation of the actual operation of the present invention, as presented in detail referring to FIG. 7. To simplify the explanation of the functions that are unique to the preferred embodiment, it is assumed that for all the examples in FIG. 8 the DIM, using the current function, is not performed. Shown from the left in all the examples in FIG. 8 are the screens of the display devices 1, 2 and 3.

Furthermore, as is shown in FIG. 8, dotted windows represent active windows while blank windows represent inactive windows, and a mouse pointer (cursor) is represented by an arrow. Here, the description of an active window includes an active child window.

In case (1) 810, a plurality of window icons are displayed on the left display device 1 (812), a window and a mouse pointer are not displayed on the middle display device 2 (814), and an active window and a mouse pointer are displayed on the right display device 3 (816). In case (1) 810, the three display devices are in the ON state at the beginning. However, since neither the active window nor the mouse pointer is displayed on the display device 1 (812) and the display device 2 (814), a time out occurs after a predetermined period of time has elapsed and these display devices are moved to the OFF state or to the DIM state. On the other hand, since both the active window and the mouse pointer are displayed on the display device 3 (816), the display device 3 (816) is maintained in the ON state.

In case (2) 820, a plurality of window icons are displayed on the left display device 1 (822), one part of an active window is displayed on the middle display device 2 (824), and one part of the active window and a mouse pointer are displayed on the right display device 3 (826). In case (2) 820, the three display devices are in the ON state at the beginning. However, since neither the active window nor the mouse pointer is displayed on the display device 1 (822), a time out occurs after a predetermined period of time has elapsed and the display device 1 (822) is moved to the OFF state or to the DIM state. On the other hand, since at least one part of the active window is displayed on the a display devices 2 (824) and 3 (826), they remain on.

In case (3) 830, a plurality of window icons are displayed on the left display device 1 (832), a mouse pointer is displayed on the middle display device 2 (834), and an active window is displayed on the right display device 3 (836). In case (3) 830, the three display devices are in the ON state at the beginning. However, since neither the active window nor the mouse pointer is displayed on the display device 1 (832), a time out occurs after a predetermined period of time has elapsed and the display device 1 (832) is moved to the OFF state or to the DIM state. On the other hand, since at the least either the mouse pointer or the active window is displayed on the display devices 2 (834) and 3 (836), they remain on.

In case (4) 840, a plurality of window icons are displayed on the left display device 1 (842), an inactive window and a mouse pointer are displayed on the middle display device 2 (844), and an active window is displayed on the right display device 3 (846). In case (4) 840, the three display devices are in the ON state at the beginning. However, since neither the active window nor the mouse pointer is displayed on the display device 1 (842), a time out occurs after a predetermined period of time has elapsed and the display device 1 (842) is moved to the OFF state or to the DIM state. On the other hand, since either the mouse pointer or the active window is displayed on the display devices 2 (844) and 3 (846), they remain on.

In case (5) 850, a plurality of window icons is displayed on the left display device 1 (852), a window and a mouse pointer are not displayed at the beginning on the middle display device 2 (854), and an inactive window and a mouse pointer are displayed on the right display device 3 (856). In case (5) 850, the three display devices are in the ON state at the beginning. However, since neither the active window nor the mouse pointer is displayed on the display device 1 (852) and the display device 2 (854), a time out occurs after a predetermined period of time has elapsed and these display devices are moved to the OFF state or to the DIM state. On the other hand, since the mouse pointer is displayed on the display device 3 (856), the display device 3 (856) is maintained in the ON state. In this example, the display device 2 (854) is turned off, and is temporarily turned on again to display a pop-up window.

In case (6) 860, at the beginning a plurality of window icons are displayed on the left display device 1 (862), an inactive window is displayed on the middle display device 2 (864), and an inactive window and a mouse pointer are displayed on the right display device 3 (866). In case (6) 860, the three display devices are in the ON state at the beginning. However, since neither the active window nor the mouse pointer is displayed on the display device 1 (862) and the display device 2 (864), a time out occurs after a predetermined period of time has elapsed and these display devices are moved to the OFF state or to the DIM state. On the other hand, since the mouse pointer is displayed on the display device 3 (866), the display device 3 (866) is maintained in the ON state. In this example, the display device 2 (864) is turned off, and is temporarily turned on again to display a pop-up window.

In case (7) 870, a plurality of window icons are displayed on the left display device 1 (872), an inactive child window is displayed on the middle display device 2 (874), and an active window and a mouse pointer are displayed on the right display device 3 (876). In case (7) 870, at the beginning the three display devices are in the ON state. However, since neither the active window nor the mouse pointer is displayed on the display device 1 (872) and the display device 2 (874), a time out occurs after a predetermined period of time has elapsed and these display devices are moved to the OFF state or to the DIM state. On the other hand, since both the active window and the mouse pointer are displayed on the display device 3 (876), the display device 3 (876) is maintained in the ON state.

In case (8) 880, a plurality of window icons are displayed on the left display device 1 (882), an inactive window is displayed on the middle display device 2 (884), and an active window and a mouse pointer are displayed on the right display device 3 (886). In case (8) 880, at the beginning the three display devices are in the ON state. However, since neither the active window nor the mouse pointer is displayed on the display device 1 (882) and the display device 2 (884), a time out occurs after a predetermined period of time has elapsed and these display devices are moved to the OFF state or to the DIM state. On the other hand, since both the active window and the mouse pointer are displayed on the display device 3. (886), the display device 3 (886) is maintained in the ON state.

Figure 9:
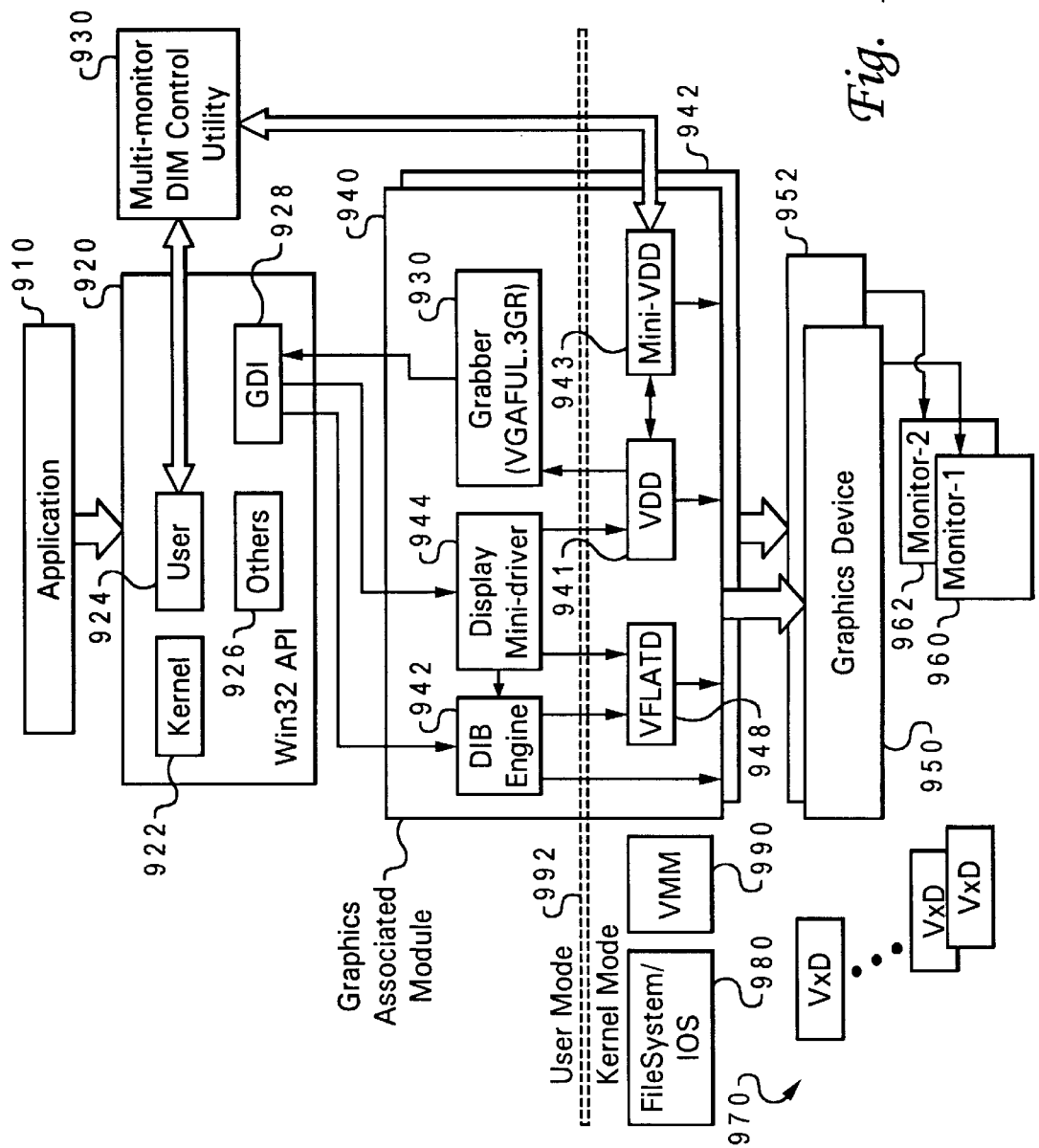
FIG. 9 is a diagram illustrating an operating system in accordance with a preferred embodiment of the present invention.

FIG. 9 is a block diagram illustrating the portion of the operating system (OS) associated with the present invention. In FIG. 9, the portion above the broken line 992 represents a user mode (ring 3), and the portion below the broken line 992 represents a kernel mode (ring 0) that performs the functions of a supervisor mode.

An application 910 can use a Win32 API (Application Programming Interface) 920 that is provided by a system virtual machine. The Win32 API 920 includes, as a system service, a GDI (Graphic-Device Interface) 928 that functions as a graphics interface, a kernel 922, a user 924, and other functions 926. The GDI 928 controls graphic devices 950 and 952 via graphics associated modules 940 and 942 in the user mode and the kernel mode, and the results are displayed on monitors 960 and 962. In the kernel mode, a file system/IOS (Input and Output Supervisor) 980, a virtual machine manager VMM 990 and various types of virtual device drivers VxD 970 are also provided.

In FIG. 9, a multi-monitor DIM control utility 930 is additionally provided to implement the present invention. Furthermore, the alteration of a Mini-VDD 943 is required to implement the present invention. The application 910 issues an instruction to the GDI 928, which has a function for drawing linear lines, circles, polygons and characters.

A display mini-driver 944 includes only code that depends on the hardware of the display adaptor, and transmits, directly to a DIB engine 942, a call from the portion of the GDI 928 that does not depend on the hardware.

The virtual device driver (VDD) 941 is required to initialize the graphic sub-system for initialization of the system, and to display output from a non-system virtual machine (typically an MS-DOS application). The Mini-VDD 943 assists VDD 941 in device-dependent operations of graphic sub-system.

When the MS-DOS application is first operated in the character mode on the full-screen, and is displayed again in the MS-DOS window on the bit map mode screen of the GUI base, text information on the full-screen is read by the VDD 941 and a grabber 946, and is converted, by the GDI 928, into a bit map that is drawn in the MS-DOS window. A virtual flat frame buffer driver (VFLATD) 948 converts a buffer address into a linear address when the display adaptor does not support a linear frame buffer and has only a frame buffer with an old bank structure.

Figure 10:
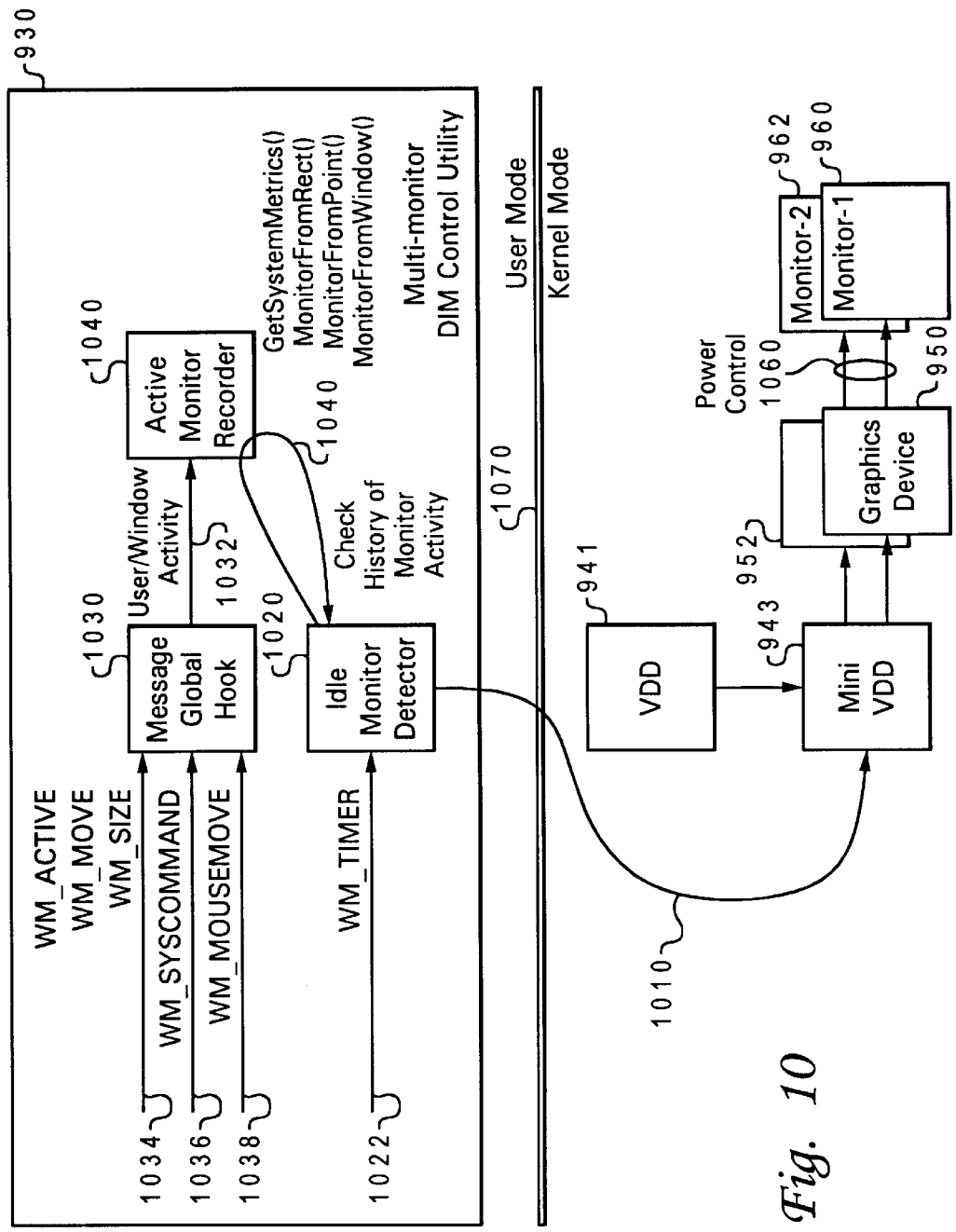
FIG. 10 is a schematic diagram illustrating a system in accordance with a preferred embodiment of the present invention.

FIG. 10 is a detailed diagram illustrating the internal structure of the multi-monitor DIM control utility 930 in FIG. 9. The multi-monitor DIM control utility 930 includes a message global hook (MGF) 1030, an active monitor recorder (AMR) 1040 and an idle monitor detector (IMD) 1020.

The message global hook (MGF) 1030 receives a message WM__XXX from an API user (USER) 924. The MGF 1030 examines the received message, extracts information concerning an active window and a mouse pointer, and transmits the information to the active monitor recorder (AMR) 1040 (1032). The idle monitor detector (IMD) 1020 receives a message WM__TIMER 1022 from the user 924, examines the histories of individual monitors recorded in the AMR 1040 to determine a monitor for which the power state should be changed, and transmits the result to the Mini-VDD 943 (1010).

The Mini-VDD 943 transmits the instruction to the corresponding graphics device 950 or 952, which in turn controls the power state of the monitor 960 or 962 connected thereto.

The active window is a top level window of the application that the user operates. To easily recognize the active window, normally the active window is placed in the foreground of the screen, and the colors of a title bar, etc., differ from those of the other window. In addition, only the top level window can serve as the active window. Therefore, when the user is working at the top level on a child window instead of a parent window, the parent window becomes active. Only one window can be active at a same time. The pop-up window is also an active window.

The outlines of the functions associated with FIG. 10 are as follows:

WM__ACTIVE is a message to be transmitted when a specific window becomes active or inactive.

WM__MOVE is a message to be transmitted when a specific window is moved.

WM__SIZE is a message to be transmitted when the size of a specific window is changed.

WM__SYSCOMMAND is a message to be transmitted to a window when the user selects a command from a system menu (or a control menu), or when the user selects a button for maximizing or minimizing the window.

WM__MOUSEMOVE is a function for reporting a window to which the cursor has been moved.

WM__TIMER is a function for reporting the elapse of time set for the timer.

GetSystemMetrics( ) is a function for returning values concerning multiple monitor system.

MonitorFromRect( ) is a function for obtaining.the handle for a monitor that has the greatest area that intersects a predetermined rectangle.

MonitorFromPointo is a function for obtaining the handle for a monitor that includes a predetermined point (position).

MonitorFromwindow( ) is a function for obtaining the handle for a monitor that has the greatest area that intersects the rectangular frame of a predetermined window.

With the above arrangement, according to the preferred embodiment, there is provided a method for managing the power supply to individual display devices, in a computer system to which a plurality of display devices can be connected. Further, a computer system for reducing the wasteful power consumption is provided.

In addition, the preferred embodiment provides is a system whereby only a display device that is actually being used by a user is turned on, and all other displays are turned off, so that the user can concentrate on the display device screen that he or she is currently using.

The power management method of the preferred embodiment is compatible with the conventional method, and can be implemented by changing the conventional method only slightly.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A computer system comprising:
   a plurality of display devices, said plurality of display devices including a first display device and a second display device;
   an input device;
   an active window displayed in said first display device for displaying input from said input device;
   a pointer cursor displayed on said second display device; and
   a control means for keeping said second display device turned on at least as long as said pointer cursor is displayed on said second display device and said input is being received from said input device for display on said first display device.

2. The computer system of claim 1, wherein said second display device moves to a reduced power state after a predetermined period of time from when said input is no longer received from said input device for display on said first display device.

3. The computer system of claim 2, wherein said reduced power state is a "standby" state.

4. The computer system of claim 2, wherein said reduced power state is an "off" state.

5. The computer system of claim 2, wherein said first display device moves to a reduced power state after a predetermined period of time from when said input is no longer received from said input device for display on said first display device, said computer system further comprising:
   means for turning said first display device and said second display device back on if a new input is input by said input device.

6. The computer system of claim 1, further comprising:
   a third display device in said plurality of display devices, said third display device displaying neither said pointer cursor nor said active window, wherein said third display device moves to a reduced power state after a predetermined period of time from when said third display device was initially turned on.

7. A method of managing power to a plurality of display devices in a computer system, said method comprising:

turning on all said display devices;

keeping a first display device, from said plurality of display devices, turned on as long as said first display device is displaying an active window that is displaying a new input from an input device; and keeping a second display device, from said plurality of display devices, turned on as long as a pointer cursor is displayed on said second display device and said first display device is turned on.

8. The method of claim 7, further comprising:

moving said second display device to a reduced power state after a pre-determined period of time from when said new input is last input by said input device for display on said first display device.

9. The method of claim 8, wherein said reduced power state is a "stand-by" state.

10. The method of claim 8, wherein said reduced power state is an "off" state.

11. The method of claim 8, further comprising:

turning said second display device back on if an active window is positioned on said second display device.

12. The method of claim 7, further comprising:

moving a third display device from said plurality of display devices to a reduced power state, said third display device displaying neither an active window nor a pointer cursor, after a predetermined amount of time from when said plurality of display devices are turned on.

13. The method of claim 12, further comprising:

moving said first display device and said second display device to a reduced power state after a pre-determined period of time from when said new input is last input by said input device for display on said first display device.

14. The method of claim 13, further comprising:

turning any of said plurality of display devices back on if an active window is moved to said any display device.

15. The method of claim 13, further comprising:

turning any display device back on if said pointer cursor is moved to said any display device.

16. The method of claim 13, further comprising: turning on all said display devices back on if a subsequent input is input from said input device.

* * * * *